(12) United States Patent
Wang et al.

(10) Patent No.: US 7,745,206 B2
(45) Date of Patent: Jun. 29, 2010

(54) AFM FOR SIMULTANEOUS RECOGNITION OF MULTIPLE FACTORS

(75) Inventors: Hongda Wang, Changchun (CN); Stuart Lindsay, Phoenix, AZ (US)

(73) Assignee: Arizona State University, Tempe, AZ (US)

(*) Notice: Subject to any disclaimer, the term of this patent is extended or adjusted under 35 U.S.C. 154(b) by 32 days.

(21) Appl. No.: 12/022,072

(22) Filed: Jan. 29, 2008

(65) Prior Publication Data

US 2008/0209989 A1    Sep. 4, 2008

Related U.S. Application Data

(60) Provisional application No. 60/887,020, filed on Jan. 29, 2007.

(51) Int. Cl.
   *C12M 1/34*  (2006.01)
   *C12M 3/00*  (2006.01)
(52) U.S. Cl. .............. 435/287.2; 435/7.1; 435/283.1; 435/287.1; 436/518; 436/524; 422/50; 422/68.1; 850/5; 850/33

(58) Field of Classification Search .................. 435/7.1, 435/283.1, 287.1, 287.2; 436/518, 524; 422/50, 422/68.1; 850/5, 33
See application file for complete search history.

(56) References Cited

U.S. PATENT DOCUMENTS

| 5,958,701 A * | 9/1999 | Green et al. .................. 435/6 |
| 6,189,374 B1 * | 2/2001 | Adderton et al. .............. 73/105 |
| 2004/0129064 A1 * | 7/2004 | Hinterdorfer et al. ......... 73/105 |
| 2007/0128623 A1 * | 6/2007 | Park et al. ...................... 435/6 |

* cited by examiner

*Primary Examiner*—Melanie Yu

(57) ABSTRACT

An atomic force microscope and a method for detecting interactions between a probe and two or more sensed agents on a scanned surface and determining the relative location of two or more sensed agents is provided. The microscope has a scanning probe with a tip that is sensitive to two or more sensed agents on said scanned surface; two or more sensing agents tethered to the tip of the probe; and a device for recording the displacement of said probe tip as a function of time, topographic images, and the spatial location of interactions between said probe and the two or more sensed agents on said surface.

7 Claims, 4 Drawing Sheets

AFM FOR SIMULTANEOUS RECOGNITION OF MULTIPLE FACTORS

CROSS REFERENCE TO RELATED APPLICATION

The present application claims the benefit of co-pending U.S. provisional application Ser. No. 60/887,020 filed Jan. 29, 2007. The disclosure of the co-pending provisional application is incorporated herein by reference in its entirety.

STATEMENT OF GOVERNMENT SUPPORT

The work herein was supported in part by NIH grant CA 85990 and NSF grants CCF-0453686 and CCF-0453685; thus the United States Government may have certain rights to this invention.

FIELD OF THE PRESENT INVENTION

Aspects of the present invention relate to recognition imaging. More specifically, aspects of the present invention relate to using an oscillating probe with at least two different sensing agents to scan a surface and map the location of at least two chemical entities recognized by the bound sensing agents.

BACKGROUND

Atomic force microscopes (AFMs) are capable of producing images at molecular resolutions in water, making them a useful tool for biological and chemical imaging. AFMs, however, are limited because when complex samples are imaged, it is nearly impossible to differentiate between molecular targets, such as proteins, of the same molecular weight from the topographical image alone.

Recognition imaging is a technique that gives an AFM chemical sensitivity. U.S. Pat. No. 7,152,462, which is herein incorporated by reference in its entirety, discloses an atomic force microscope having an antibody tethered to the probe tip. The antibody tethered to an oscillating AFM sensing probe, binds to its antigen and changes the pattern of oscillation as the probe is scanned over the surface. A map of these changes, superimposed onto the topographic image, can show where the targets are located in the image.

FIGS. 1a and 1b show a typical prior art AFM configured for recognition imaging. The AFM's sensing probe consists of an oscillating cantilever 101 and a sensing agent 102 tethered to the probe's tip 107 by a short, flexible tether 108. The AFM contains a mechanism for recording the oscillation waveform detected as the probe is scanned across a surface 103. If the sensing agent 102 does not bind to a target on the surface 103, the waveform can look like the graph oscillation pattern 104 shown above FIG. 1a. If the sensing agent 102 does bind to a target on the surface 103, the waveform might look like the graph oscillation pattern 106 shown above FIG. 1b.

While a configuration such as the one shown in FIGS. 1a and 1b can provide a means for mapping compositions such as proteins on a nm-scale, it is limited to detecting only one target per image. A critical aspect of many chemical and biological systems lies in the relative spatial arrangement of different participants in the reactions or processes. Many biological pathways involve complex and so-called associated "co-factors," such as other proteins that must be recruited before an assembly becomes active. For example, in the case of a complex process like initiation of gene transcription, many factors must be recruited and assembled. Therefore, it is often important to know not only what factors are present individually in a sample, but also to know where one factor is positioned with respect to another.

In order to locate a different target using the systems and methods currently available in the art, the user must change the probe tip to one having a different sensing agent and then record a second image. Because of the time it takes to change the probe tip as well as the process of physically moving the tip, it is difficult, if not impossible, to draw any conclusions as to the relative locations of different targets based solely on the two recorded images. Statistical analysis of the two images can produce estimates as to the targets' relative positions, but such analysis is computationally complex and still only produces estimated results.

Therefore, there is a need in the art of recognition imaging for a probe that enables the determination of the relative locations of at least two different factors at once.

SUMMARY OF THE INVENTION

The present invention provides an improved atomic force microscope and a method of using the same for detecting interactions between a probe and two or more targets on a scanned surface. The scanning probe can have a tip that is sensitive to a property of the scanned surface and can have two or more sensing agents tethered to the tip. Mechanisms for recording the displacement of the probe tip as a function of time, recording topographic images of the surface, and recording the spatial location of interactions between the probe and the two or more sensed agents on the surface can be used to produce images showing the location of multiple targets on the surface. A reagent can be used to remove one sensing agent from the tip, and the surface can be rescanned to generate a second image. The two images can be used to tell the location of the multiple targets as well as to identify the types of targets.

DETAILED DESCRIPTION

Figure 1A:
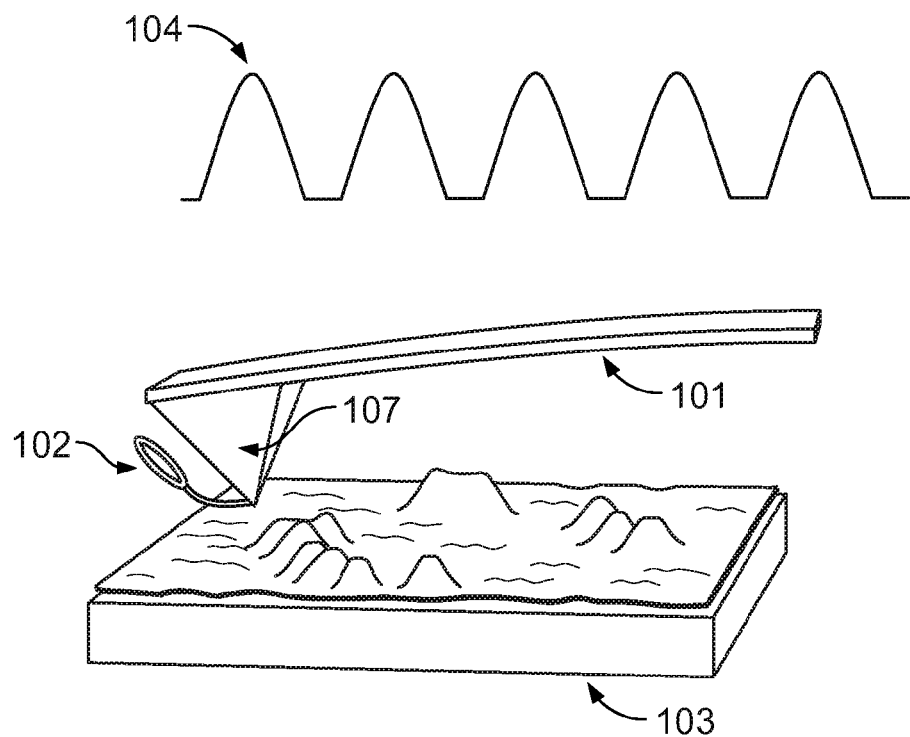
FIGS. 1a and 1b show a prior art AFM probe configured for recognition imaging according to known techniques.
Figure 1B:
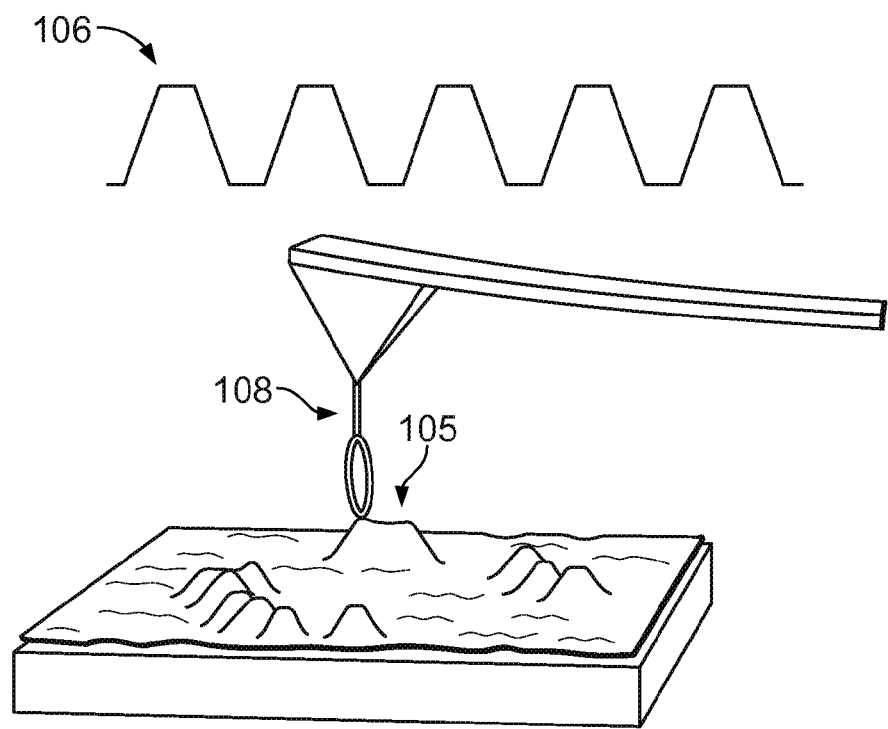

The present invention may be useful in providing high spatial resolution of many physical, chemical, and biological interactions on both hard and soft surfaces. In accordance with one aspect of the present invention, a recognition force microscope for detecting interactions between a probe and two or more targets on a scanned surface is provided and can include a scanning probe having a tip that is sensitive to a property of a surface, with the probe adapted to oscillate with a low mechanical Q factor (i.e. the quality factor of a cantilever probe), where $Q=f_1/\Delta f_1$, where $f_1$ is the first resonance frequency of the cantilever and $\Delta f_1$ is the full width of the resonance peak at half-maximum. "Low mechanical Q factor" can mean a Q factor of greater than zero and equal to or less than about 20. The Q factor of the cantilever can be determined by the stiffness of the cantilever and the viscosity of the medium in which it oscillates, and also, to some extent, by the geometry of the cantilever. A Q factor of about equal to or less than 20 can be typical of what might be measured for cantilevers having a stiffness of a few Newtons per meter oscillated in water, which can be typical conditions used for imaging biological materials with an atomic force microscope (AFM).

The microscope can also include a means for recording the displacement of the probe tip as a function of time and means for recording both topographical data and recognition data, i.e. the spatial location of interactions between the probe and sensed agents (i.e.: targets interacting with the probe tip) on the surface. The means for recording the displacement of the probe tip as a function of time can include a source of radiation such as a laser that is directed at the probe, a position sensitive detector that detects radiation reflecting off of the surface of the probe, and a controller that processes the detected radiation. The means for recording both the topographical and recognition data can include processing circuitry that generates separate topographical and recognition signals. The amplitudes of the respective upward and downward swings (displacements) of the probe tip can be recorded and used to determine both topographic data and recognition data to identify the spatial location of interaction sites between the probe tip and the sensed agents on a sample surface.

The probe tip can be sensitized with two or more sensing agents that each bind to a specific target. The sensing agents can be tethered to the probe tip by a flexible crosslinker (i.e., a chemical agent that binds the sensing agent to the probe tip). However, the apparatus and methods of the present invention are not limited to molecular binding or bonding but can also include other chemical and physical interactions such as electrostatic charge interactions and hydrophobic/hydrophilic interactions. Thus, the "sensing agent" on the probe tip may also be tethered by electrical and/or chemical modifications to the tip.

A time varying magnetic field can be used to excite the probe into motion using a magnetic material that forms at least a portion of the probe. The topographic and recognition data signals that are detected and recorded can be separated by an electronic circuit that includes means for determining the average value of the displacement of the probe (for example, by using a deflection signal generated from the position sensitive detector) on a time scale that is sufficiently long compared to changes caused by topography or binding events such that those events can be separately recognized and measured. The electronic circuit can also include means for using the average value of the displacement of the probe to determine the downward amplitude of the probe from the difference between the average value and the value of the downward displacement. These means can include a digital signal processor operating using a recognition-imaging algorithm.

The electronic circuit can also include means for controlling the height of the probe. The means for controlling the height of the probe might include a piezoelectrically driven scanning element in conjunction with a controller. Thus, topography can be determined using the downward value of the probe tip displacement. The electronic circuit can also include means for determining the value of the upward displacement of the probe from the measured amplitude and the average value of the displacement to generate a signal corresponding to interactions between a sensing agent and a sensed agent on the surface being scanned. The means for determining these values might include a digital signal processor operating using a recognition-imaging algorithm.

The topographic and recognition signals can be separated by an electronic circuit that includes means for digitizing the recorded deflection of the probe tip and computing means for determining the average value of the displacement of the probe tip on a time scale that is sufficiently long compared to changes caused by topography or binding events such that those events are separately recognized and measured. The digitizing means might include one or more A/D converters. The electronic circuit can also include means for using the average value of the displacement of the probe to determine the downward amplitude from the difference between the average value and the value of downward displacement. The means for determining these values might include a digital signal processor operating using a recognition-imaging algorithm.

The electronic circuit can also include means for controlling the height of the probe to determine the topography of the sample using the value of downward displacement and means for determining the value of the upward displacement from the upward amplitude and the average value of displacement to generate a signal corresponding to interactions between a sensing agent on the probe tip and a sensed agent on the surface being scanned.

The probe tip displacement can be measured as a function of time used to determine the spatial location of recognition events by comparison to a predicted or recorded displacement pattern generated for the case when there is no recognition.

The present invention also provides a method of operating an atomic force microscope which can include scanning a probe oscillating with a low mechanical Q factor that is sensitive to two or more properties of a surface, recording the displacement of the probe tip as a function of time, and simultaneously recording both topographical images and the spatial location of interactions between the probe and the sensed agents on the surface of a sample. The method can use the extent of the upward displacement of the probe tip to measure interactions between the probe tip and the sample surface. The height of the probe tip above the sample surface can be controlled by using either the extent of the downward displacement of the probe tip (i.e., bottom amplitude), the overall amplitude of the probe tip (i.e., the sum of the upper and lower amplitudes of the tip divided by two), or the average deflection signal (i.e., the difference between the upper and lower amplitudes of the tip).

In another embodiment of the present invention, a method of operating an atomic force microscope is implemented whereby chemical information is recorded through the interaction of two or more sensing agents on the probe of the microscope with a sample. The method may further include recording a first image corresponding to the location of all sensed chemicals, and then adding one or more chemical agents to the same region of the sample and re-imaging the sample.

The methods can be used to perform recognition imaging to determine the relative spatial arrangement of two or more participants in any type of reaction or process of interest, including but not limited to gene transcription, gene translation, cytoskeletal assembly and dynamics, membrane assembly and dynamics, cell signaling pathways, macromolecular assembly processes, enzymatic pathways, metabolic pathways, protein folding, etc. Furthermore, the methods of the invention can be used to assess the effect of drug candidates on any of these processes.

Accordingly, it is a feature of the present invention to provide an atomic force microscope and method of operating it that provides separate and simultaneous topography and recognition images for two or more agents simultaneously as well as rapid quantitative measurement of molecular binding with high spatial resolution. This and other features and advantages of the invention will become apparent with the reference to the accompanying figures and the appended claims.

Figure 2:
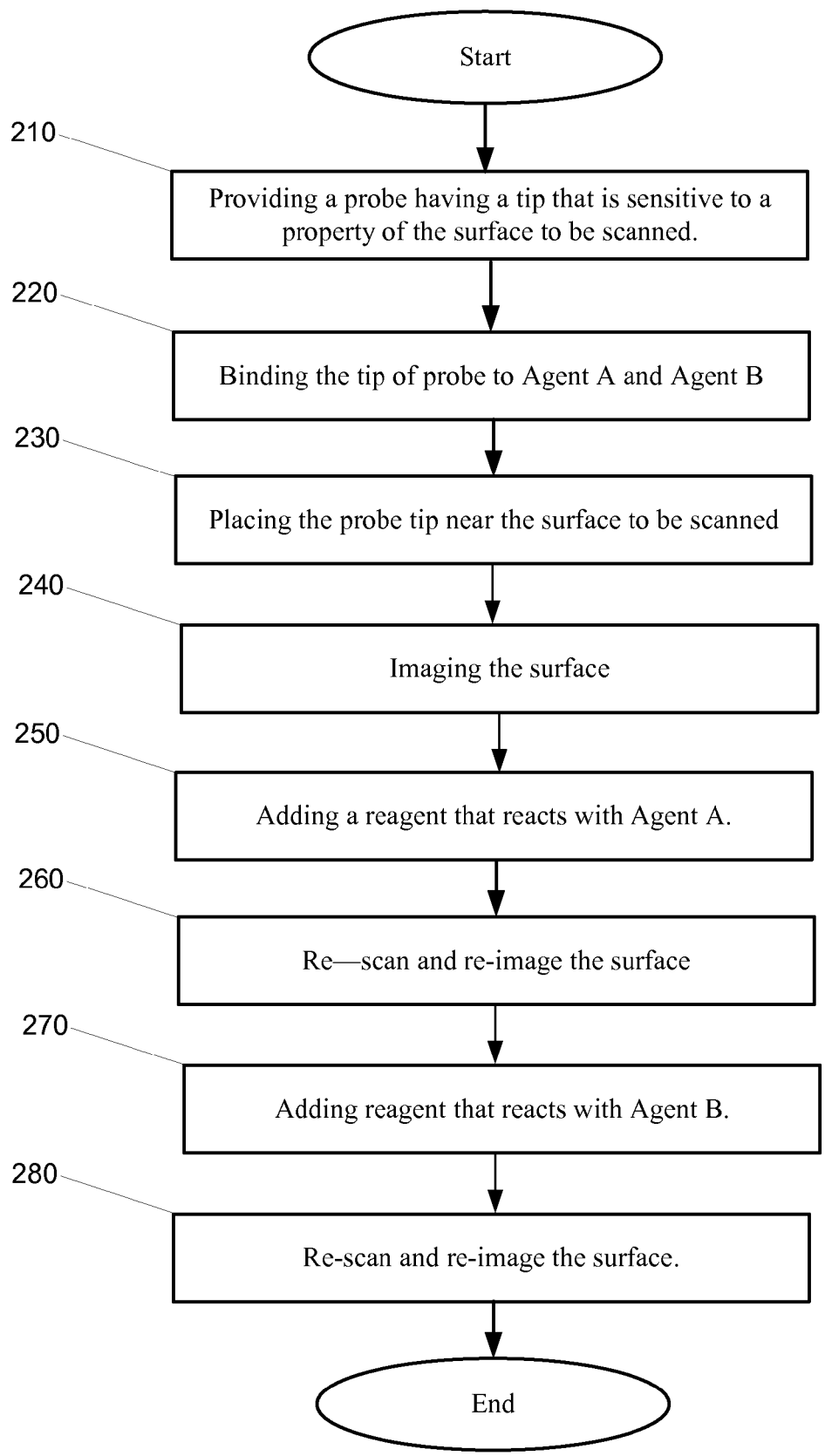
FIG. 2 is a flow chart of an embodiment of the present invention.

FIG. 2 shows a flow chart illustrating a method embodying aspects of the present invention. The method can begin by providing an AFM with a probe having a tip sensitive to properties of a surface to be scanned (block 210). Multiple sensing agents, referred to as A and B for simplicity, can be bound to the tip of the probe (block 220). Sensing agents can be chosen based on the target to be detected. Although the examples in this disclosure might be limited to two sensing agents, it will be readily apparent to those skilled in the art that the present invention can be applied to systems and methods using more than two sensing agents without the use of inventive faculty.

After sensing agents A and B have been bound to the tip, the probe tip can be placed near the surface, and the surface can be scanned (block 230). From the scan, a first image showing where agents A and B bound to targets can be generated (240). A reagent that reacts with sensing agent A can then be used to remove sensing agent A from the probe tip or added to the surface to prevent agent A from binding to its target (block 250), and the surface can be rescanned and re-imaged (block 260) to generate a second image showing where only agent B bound to a target. Based on the two images, the relative locations of the targets sensed by A and the targets sensed by B can be determined.

For purposes of ensuring accuracy, a further aspect of the present method can include using a second reagent that reacts with agent B to remove B from the probe tip or to prevent it from binding its target (block 270), and re-scanning and re-imaging the surface for a third time (block 280). With A and B both removed from the tip, the third image should not show the presence of any targets. The presence of a third target can serve as a warning to the microscope operator that the method was either performed incorrectly or the equipment used was not operating correctly.

Figure 3:
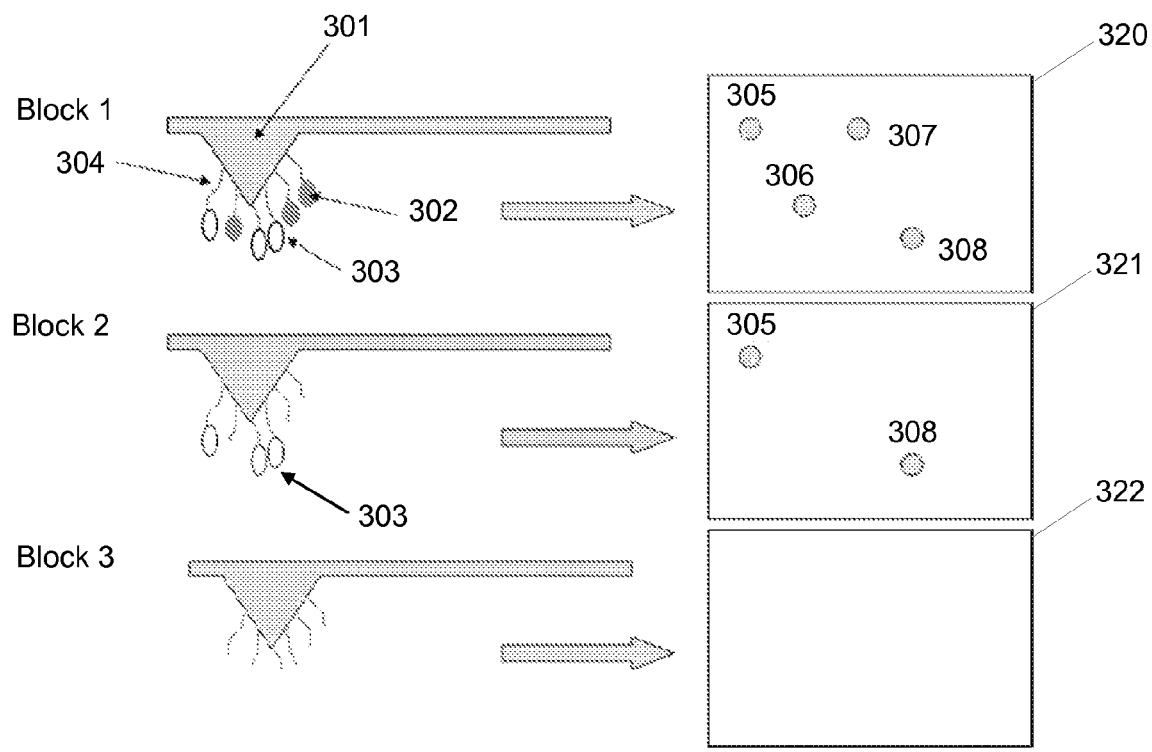
FIG. 3 shows an AFM probe configured for the recognition of two distinct factors according to an embodiment of the present invention.

FIG. 3 shows a probe with the probe tip 301 modified according to an embodiment of the present invention. The probe tip 301 can be treated with a reactive tether 304 that is specifically reactive to a sensing agent, such as but not limited to an antibody, polypeptide, nucleic acid (including but not limited to aptamers), lipid, carbohydrate, or other ligand, used for recognition. For example, antibodies may be treated with a thiolating agent, and the tether may be terminated with a maleimide residue that reacts with the thiol.

The probe may be adapted to oscillate with a low mechanical Q factor. A "Q factor" is defined as $Q=f_1/\Delta f_1$, where $f_1$ is the first resonance frequency of the cantilever and $\Delta f_1$ is the full width of the resonance peak at half-maximum. A "low mechanical Q factor" is a Q factor of greater than zero and equal to or less than about 20. The Q factor of the cantilever is determined by the stiffness of the cantilever and the viscosity of the medium in which it oscillates, and also, to some extent, by the geometry of the cantilever. A Q factor of about equal to or less than 20 is typical of what might be measured for cantilevers having a stiffness of a few Newtons per meter oscillated in water. This is typical of the conditions used for imaging biological materials with an atomic force microscope (AFM).

The probe includes an apparatus (not shown) to record displacement of the probe tip 301 as a function of time, and to record both topographic images and the spatial location of interactions between the sensing agents 302, 303 on the probe tip 301 and the sensed agents on the surface.

In one aspect, the probe tip 301 can be functionalized with a mixture of two sensing agents and the signal from the binding of each can be recorded. The mixture can be an equamolar mixture of the two sensing agents. Block 1 of FIG. 3 shows the probe tip 301 covered in a mixture of the biomolecules 302, 303. As illustrated below, there are often enough of the biomolecules within range of the surface at the end of the probe tip 301 that each may bind to a target in the same scan. For example, the probe in Block 1 of FIG. 3 might yield a recognition image like that shown in panel 320.

The imaging may be carried out under any suitable conditions, including but not limited to in a liquid cell. A reagent can be flowed into the imaging cell to block binding of one sensing agent so that a subsequent scan records the recognition signal from only the remaining sensing agent. As an example, the reagent could be a small peptide of the sequence against which an antibody was raised. Block 2 of FIG. 3 shows the probe after blocking with a reagent that binds to biomolecules 302, leaving only biomolecules 303 active. A recognition image of the same area when re-scanned shows only spots from the binding sites of 303, as shown in panel 321. Thus, the remaining spots 305 and 308 must be the targets of 303, and the missing spots 306 and 307 thus must be the targets of 302.

To further assure specific binding, in another step, another reagent may be flowed to block both biomolecules. In such a situation, all recognition should be abolished, as shown in panel 322.

In an example in accordance with an embodiment of the present invention, a mixture of chromatin samples can be imaged. The samples may include intact chromatin (DNA plus histone octamers containing 2 copies each of Histones H2A, H2B, H3 and H4) mixed with so-called 'tetramer' chromatin (contains only Histones H3 and H4). This sample can be used because tetrameric histones are recognizable in the topographic image alone because they are not as high as the full octamers.

Figure 4:
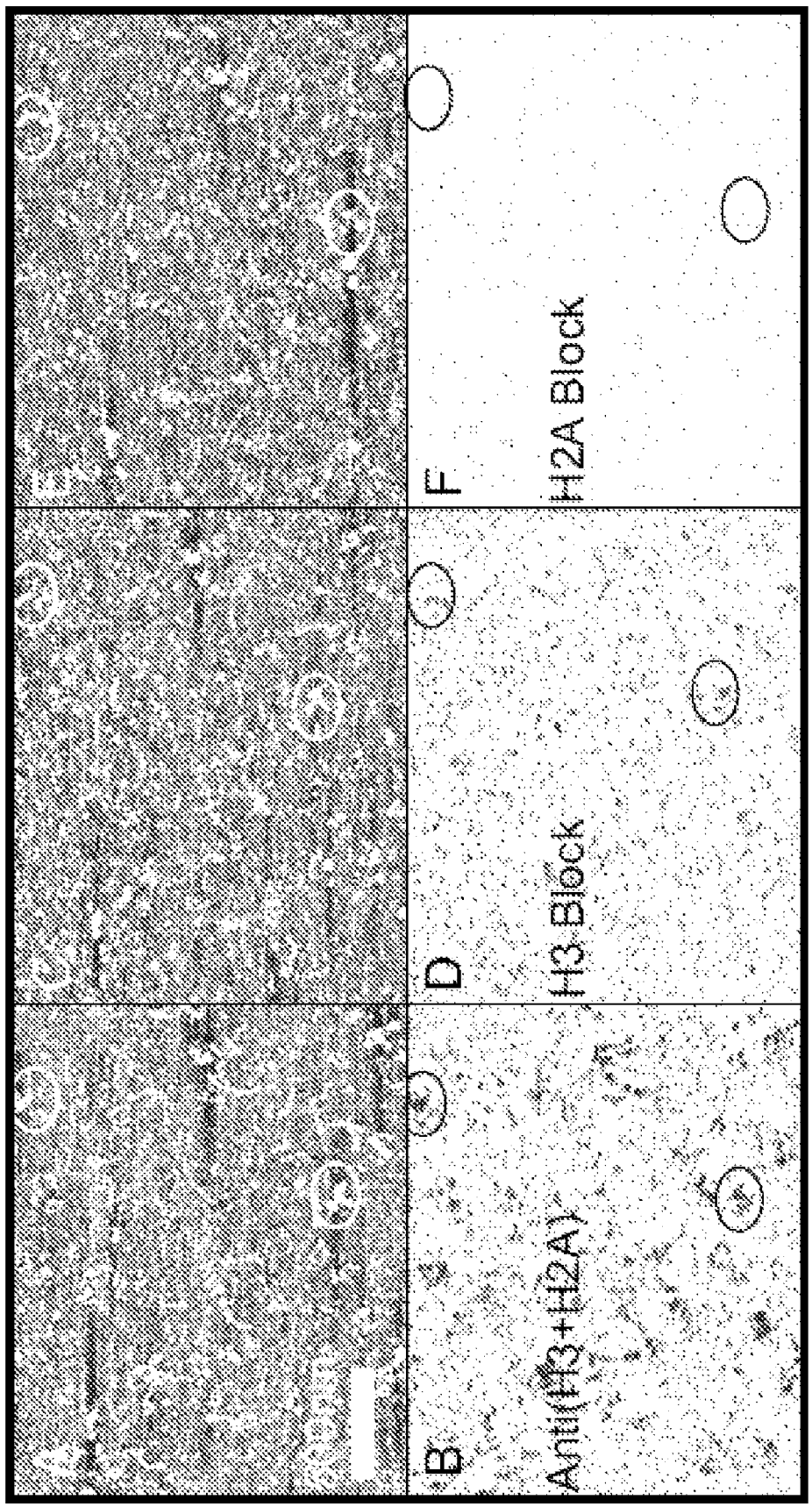
FIG. 4 shows an implementation of recognition imaging with two distinct factors in accordance with an embodiment of the present invention.

FIG. 4 illustrates the results of imaging with a probe configured in accordance with an embodiment of the present invention, according to the steps outlined in FIG. 2. In FIG. 4, the top scans (panels A, C, and E) are topographic scans of a mixture of samples containing Histone H2A and Histone H3. Panels B, D, and F are the corresponding recognition images. Panel B is a scan with both anti-Histone H3 and anti-Histone H2A attached to the probe. Panel D is a scan after blocking anti-Histone H3. Panel F is a scan after blocking anti-Histone H2A. The topographical scans (A, C, and E), and accompanying recognition images (B, D, and F) were recorded three times.

First, the sample was imaged with a tip functionalized with anti-Histone H3 antibody and anti-Histone H2A antibody. Topographic image A has two clumps of material that appear higher in the images (circled). These clumps of chromatin contain the full octamers, and thus Histone H2A. The other, smaller features are, tetrameric nucleosomes containing only Histones H3 and H4. The recognition image is shown in panel B. Many recognition events correspond to both the tetrameric nucleosomes and the octamers (circled).

Second, a peptide against which the anti-Histone H3 was raised and injected into the imaging cell to block binding. The resulting topographic image C and recognition image D were recorded. The topography of image C may be slightly degraded due to the addition of the peptide, but the same features are still visible. However, the recognition image D now shows features corresponding to the histone octamers only (circled).

Third, intact Histone H2A was also added to the liquid cell (causing some disruption of the topographic image E) to completely block binding. The recognition is now completely abolished, as shown in image F, thus showing that the binding was specific.

One non-limiting example of a sample that might be imaged with the present invention could be salt-reconstituted nucleosomal arrays (octamer MMTV and Tetramer MMTV H3/4) containing the mouse mammary tumor virus (MMTV) promoter. The arrays can be deposited on glutaraldehyde aminopropyltriethoxysilane (GD-AP TES)-treated mica, derivatized at 1 µM levels with GD, and allowed to adsorb for 40 min.

An AFM, such as the PicoTREC (Molecular Imaging), can be used to obtain a recognition signal. Magnetized cantilevers can be driven by a MacMode dynamic-force microscope (Molecular Imaging). Images may be taken in 10 mM NaCl/5 mM phosphate buffer, pH 7.5, with 3-nm peak-to-peak amplitude oscillation at 8 kHz, imaging at 70% set point, and scanning at 1 Hz. The recognition and topographical images can be obtained simultaneously. The recognition images may be blocked by 10 µl 30 ug/ml H3 peptide first, then blocked by 20 µl 30 µg/ml H2A histone.

Example

An example procedure for modifying the probe with antibodies, in accordance with an embodiment of the present invention, is set forth below. In the described example, the Buffer A solution is 100 mM NaCl, 50 mM $NaH_2PO_4$, 1 mM EDTA, pH 7.5; the PBS buffer is 150 mM NaCl, 5 mM $Na_2HPO_4$, pH 7.5; the $NH_2OH$-reagent is 500 mM $NH_2OH.HCl$, 25 mM EDTA, pH 7.5; and the SATP is N-Succinimidyl 3-(acetylthio)propionate.

Modifying antibodies with SATP is achieved by washing a PD-10-column with 30 ml buffer A; adding 200 µl (1 ml/mL) antibody and 300 µl buffer A into PD-10-column; adding 9×500 µl buffer A to wash the PD-1,0-column; collecting fraction 7 and 8 and mixing them; adding 10 fold molar excess of SATP/DMSO into collecting antibody solution for 30-60 minutes under argon; washing two PD-1,0-columns with 30 ml buffer A; adding 500 ml antibody solution into each PD-10-column and washing it with 9×500 µl buffer A separately; and collecting fraction 7 and 8 and storing the SATP-antibody in tubes of 100 µl at −70° C.

Modifying the tips with APTES is achieved by cleaning MAC-lever tips with a UV-cleaner for 15 minutes and modifying the tips with APTES as previously described by Stroh et al. [Proceedings of the National Academy of Sciences, vol 101, pp 12503-12507 2004)]. A desiccator is purged with argon for 2 minutes, and 30 µL of APTES (99%, Sigma-Aldrich, St. Louis, Mo.) is placed into a small container at the bottom of the desiccator. Ten microliters of N,N-diisopropylethylamine (99%, distilled, Sigma-Aldrich) is placed into another small container, and the desiccator is purged with argon for an additional 2 minutes. The tips are then placed into the desiccator. The desiccator is purged for another 3 minutes and then sealed off, leaving the tips exposed to APTES vapor for 30 minutes to 2 hours. After this exposure, the APTES is removed, the desiccator is purged, and the treated tips (AP-tip) are stored in a sealed desiccator until needed.

A crosslinker reaction is achieved by mixing the crosslinker and 5 µl triethylamine in 1 ml $CHCl_3$; adding $NH_2$-modified tips into the solution and waiting for 2 to 3 hours; and washing the tips with $CHCl_3$ and drying them with Argon.

The SATP-labeled antibodies are linked to the tips by incubating the tips in 100 µl mixed SATP-antibody (50 µl anti-H2A and 50 µl anti-H3), 50 µl $NH_2OH$-reagent and 100 µl buffer A for one hour and then washing the tips with buffer A and PBS buffer three times. The tips can be stored in PBS buffer at 4° C.

The previous description of embodiments is provided to enable a person skilled in the art to make and use the present invention. Various modifications to these embodiments will be readily apparent to those skilled in the art, and the generic principles and specific examples defined herein may be applied to other embodiments without the use of inventive faculty. For example, the specific compounds and chemicals mentioned above are provided merely as examples, and it may be readily apparent to those skilled in the art that different chemicals and compounds can be used without the use of inventive faculty and without deviating from the spirit of the description provided. Therefore, the present invention is not intended to be limited to the embodiments specifically described herein but is to be accorded the widest scope consistent with the entirety of the disclosure and the associated figures.

What is claimed is:

1. An atomic force microscope for detecting interactions between a probe and first and second sensed agents on a scanned surface, said microscope comprising:
    a scanning probe having a tip that is sensitive to a property of said scanned surface;
    first and second sensing agents tethered to the tip of the probe, said first and second sensing agents being sensitive to said first and second sensed agents, respectively, said first sensing agent being different from said second sensing agent; and
    means for recording a displacement of said probe tip as a function of time, recording topographic images, and recording the spatial location of interactions between said probe and said first and second sensed agents on said scanned surface.

2. The atomic force microscope of claim 1, wherein the two or more sensing agents are biomolecules.

3. The atomic force microscope of claim 2, wherein the biomolecules are selected from the group consisting of: an antibody, a polypeptide, a nucleic acid, a lipid, a carbohydrate, or a ligand.

4. The atomic force microscope of claim 1, wherein at least one of the two or more sensing agents is an aptamer.

5. The atomic force microscope of claim 1, wherein at least one of the two or more sensing agents is an antibody.

6. The atomic force microscope of claim 1, wherein at least one of the two or more sensing agents is a lectin.

7. The atomic force microscope of claim 1, wherein said probe is adapted to oscillate with a mechanical Q factor equal to or less than 20.

* * * * *